United States Patent [19]
Arai et al.

[11] Patent Number: 5,849,055
[45] Date of Patent: Dec. 15, 1998

[54] PROCESS FOR PRODUCING INORGANIC MICROSPHERES

[75] Inventors: Kiyotaka Arai; Kenji Yamada; Hachiro Hirano, all of Ichihara; Masakuni Satoh, Yokohama, all of Japan

[73] Assignee: Asahi Glass Company Ltd., Tokyo, Japan

[21] Appl. No.: 813,067

[22] Filed: Mar. 7, 1997

[30] Foreign Application Priority Data

Apr. 9, 1996 [JP] Japan ..................................... 8-086857

[51] Int. Cl.$^6$ ........................... C03B 19/01; C03B 19/09; C03B 9/00; C03B 23/00
[52] U.S. Cl. .............................. 65/17.3; 65/211; 65/213; 65/214; 501/33; 501/84; 501/85; 264/15; 264/434
[58] Field of Search ..................................... 65/17.3, 17.6, 65/21.1, 21.3, 21.2, 21.4; 264/12, 13, 14, 15, 434; 501/33, 84, 85; 502/527

[56] References Cited

U.S. PATENT DOCUMENTS

| | | |
|---|---|---|
| 3,838,998 | 10/1974 | Matthews et al. . |
| 4,333,857 | 6/1982 | Lim et al. . |
| 4,352,717 | 10/1982 | Watanabe et al. . |
| 4,649,037 | 3/1987 | Marsh et al. . |
| 4,661,137 | 4/1987 | Garnier et al. ........................... 65/21.4 |
| 4,698,317 | 10/1987 | Inoue et al. ................................ 501/9 |
| 4,715,878 | 12/1987 | Kopatz et al. ........................... 65/21.1 |
| 4,746,468 | 5/1988 | Ozaki et al. ................................ 264/9 |
| 5,069,702 | 12/1991 | Block et al. . |
| 5,071,635 | 12/1991 | Yamanaka et al. ..................... 423/592 |
| 5,256,180 | 10/1993 | Garnier et al. . |
| 5,496,403 | 3/1996 | Gaedcke et al. . |
| 5,534,348 | 7/1996 | Miller et al. ........................... 65/21.4 |

FOREIGN PATENT DOCUMENTS

| | | |
|---|---|---|
| 0 598 464 | 5/1994 | European Pat. Off. . |
| 2 671 072 | 7/1992 | France . |
| 6-263464 | 9/1994 | Japan . |
| 1119260 | 7/1968 | United Kingdom . |
| WO 90/02102 | 3/1990 | WIPO . |
| WO 95/07177 | 3/1995 | WIPO . |

*Primary Examiner*—Peter Chin
*Assistant Examiner*—Jacqueline A. Ruller
*Attorney, Agent, or Firm*—Oblon, Spivak, McClelland, Maier & Neustadt, P.C.

[57] ABSTRACT

A process for producing inorganic microspheres (solid spheres or hollow spheres), which comprises pulverizing a material by wet pulverization to an average particle size of at most 5 $\mu$m to obtain a slurry of a pulverized powder material, spraying the slurry to form liquid droplets, and heating the liquid droplets to fuse or sinter the powder material to obtain inorganic microspheres.

11 Claims, No Drawings

PROCESS FOR PRODUCING INORGANIC MICROSPHERES

The present invention relates to a process for producing inorganic microspheres.

Solid inorganic microspheres or microbeads are prepared usually by the following methods:

A method wherein a precursor is formed into microspheres, followed by heat treatment (method 1). A method for producing them by a sol-gel method (method 2). A method for producing them directly by spraying a molten material (method 3). A method wherein irregular shaped (crushed) particles made of the same material as the desired microspheres, are fused in a high temperature flame to produce them (method 4).

Method 1 is used to produce inorganic silica microbeads by heat treating spherical silica gel as the precursor. However, this method is not efficient, since it is necessary to produce the spherical silica gel as the precursor, and the process tends to be long accordingly.

Method 2 is used to produce inorganic silica microbeads by a sol-gel method by hydrolyzing an alkoxide in the presence of alkali. However, the cost for the starting material is high, and it is not an inexpensive production method.

Method 3 is limited to a glass such as a titanium-barium type glass, whereby the molten material has a high fluidity, low viscosity and high surface tension, and the composition of the material is restricted.

Method 4 is widely employed for the production of glass beads. However, when dried glass powder is dispersed in a high temperature hot air, the glass powder tends to agglomerate as its size reduces, and particles tend to fuse at the time of melting the glass, whereby it has been difficult to obtain microbeads having a uniform particle size distribution and spherical shape.

With respect to inorganic hollow microspheres, glass microballoons and processes for their production have been proposed, for example, in JP-B-49-37565, JP-A-58-156551, JP-A-61-14147 and JP-B-4-37017.

Namely, JP-A-58-156551 discloses a process which comprises melting materials such as $SiO_2$, $H_3BO_3$, $CaCO_3$, $Na_2CO_3$, $NH_4H_2PO_4$ and $Na_2SO_4$ at a high temperature of at least 1,000° C. to form a glass containing a sulfur content, then pulverizing the glass in a dry system, followed by classification to obtain fine glass powder, which is then dispersed and retained in a flame, so that is foamed by the sulfur content serving as a blowing component to form borosilicate type glass microballoons.

Further, JP-B-4-37017 discloses a method wherein fine powder having a glass-forming component and a blowing component carried on silica gel, is baked in a furnace to obtain glass microballoons.

In such conventional methods, dried glass fine powder is dispersed in a high temperature hot air, so that glass is heated, whereby the viscosity of the glass decreases, and at the same time, a gas will be generated from the blowing component by thermal decomposition. By the surface tension, the particle shape becomes spherical, and at the same time, the particles become hollow due to the gas generated in the particles. As mentioned above, in the conventional methods, dried glass fine powder is dispersed in a high temperature hot air, whereby glass powder tends to agglomerate as the particle size becomes small, and some particles are likely to fuse drying melting the glass. Accordingly, it has been difficult to obtain glass microballoons which are fine and have a uniform particle size. Further, dry pulverization is used in the process for obtaining the glass powder, and classification is required to make the particle size of the product balloons uniform, whereby a dust is formed, thus leading to a problem of environmental pollution, and at the same time, the yield of pulverized fine powder tends to be low, and agglomeration of the glass powder is likely to occur during heating. Consequently, it has been difficult to obtain glass microballoons having an uniform particle size efficiently in good yield. A long time has been required for pulverization, and the classification operation of the glass powder has been cumbersome.

Further, in these methods, to recycle fine powder other than of a desired particle size formed in the step of classification of the materials and/or the products, it has been required to remelt the fine powder to form cullets, whereby recycling is difficult, and the yield decreases, in the case of both microbeads (solid spheres) and microballoons (hollow spheres).

Further, JP-A-6-263464 discloses a method which comprises dispersing a precursor of glass in water, spraying the dispersion to form liquid droplets, and heating and fusing liquid droplets to form glass microballoons.

It is an object of the present invention to solve the above-mentioned problems of the prior art and thus to provide a process for producing inorganic microspheres as microbeads (solid spheres) and/or microballoons (hollow spheres) having fine and uniform particle sizes and easy recycling, which is efficient and applicable in a wide range.

The present invention provides a process for producing inorganic microspheres, which comprises pulverizing a material by wet pulverization to an average particle size of at most 5 μm to obtain a slurry of a pulverized powder material, spraying the slurry to form liquid droplets, and heating the liquid droplets to fuse or sinter the powder material to obtain inorganic microspheres.

The present invention is suitable particularly for processes for producing inorganic microbeads (solid spheres) and inorganic microballoons (hollow spheres) having an average particle size of at most 50 μm, which used to difficult to produce on an industrial scale in a large quantity and at low costs.

In the present invention, as the material, not only an inorganic material, but also a material which can be converted to an inorganic material by heating and burning, can be used. Further, as the powder material, a single substance material or a glass powder or a so-called glass formulation mixed powder material prepared by mixing plurality of mutually different powder materials or glass powder to have a desired composition, may be used.

Hereinafter, production of glass microbeads (solid spheres), glass microballoons and microspheres (hollow spheres) having functional powder dispersed therein, will be described. However, other inorganic microbeads such as alumina microbeads and silica microbeads as well as other inorganic microballoons can be produced in the same manner by changing the composition of the material.

When glass microbeads are to be produced, a mixed powder material is prepared by mixing various powder materials to have a desired composition. The materials to be used for the preparation of the mixed powder material include, for example, silica sand, silica gel, fumed silica, fine silica powder, alumina, sodium sulfate, sodium carbonate, sodium borate, boric acid, zinc oxide, titanium dioxide, calcium oxide, calcium secondary phosphate, potassium sulfate, potassium carbonate, potassium oxide, lithium sulfate, lithium carbonate, lithium oxide, lead oxide and glass made from these materials. However, the materials are not limited to these inorganic substances, and may be organic substances.

As a glass obtainable by such a mixed powder material, borosilicate glass, sodalime glass or zinc phosphate glass may, for example, be mentioned. However, the glass is not limited to such examples. The borosilicate glass is a glass comprising $SiO_2$—$B_2O_3$—$Na_2O$ as main components, and it is used for physical and chemical instruments and is excellent in heat resistance. The sodalime glass comprises $SiO_2$—$CaO$—$Na_2O$ as main components and is usually used for sheet glass or glass for bottles. The zinc phosphate glass comprises $P_2O_5$—$ZnO$ as main components and is used as low melting glass. A glass comprising $SiO_2$—$TiO_2$ as main components has a small thermal expansion coefficient and is useful as a filler for resins.

Using silica or alumina alone, it is possible to produce silica microbeads or alumina microbeads, respectively.

By incorporating a blowing agent which decomposes and generates a gas at a temperature at which the mixed material is vitrified, to the mixed powder material, it is possible to produce glass microballoons.

The blowing agent generates a gas when the glass formulation mixed material is vitrified to form spheres under heating and thus has a function to make the vitrified molted glass hollow.

Specifically, the blowing agent may, for example, be a sulfate, a carbonate, a nitrate or an acetate of sodium, potassium, lithium, calcium, magnesium, barium, aluminum or zinc. Such a blowing agent is incorporated preferably in an amount of from 0.05 to 20.0 wt % as calculated as $SO_3$, $NO_2$ or $CO_2$ in glass. The content is adjusted depending upon the particle size of the product and the degree of foaming. As the base material for glass microballoons, borosilicate glass is preferred, since it has high strength and whereby the degree of alkali elution is low.

In the present invention, the powder material is subjected to wet pulverization, whereby it is possible to obtain inorganic microspheres wherein titanium dioxide, cerium oxide, zinc oxide, copper, silver, tin oxide or antimony pentoxide, which used to be hardly uniformly incorporated, is incorporated extremely uniformly in a particle form.

Among them, inorganic microspheres containing titanium dioxide, cerium oxide or zinc oxide, have an ultraviolet ray-absorbing function. Further, inorganic microspheres containing copper, silver or tin oxide have an electromagnetic shielding function. Likewise, inorganic microspheres containing titanium dioxide have a photocatalytic function. Further, inorganic microspheres containing silver or copper have an antibacterial function. Inorganic microspheres containing antimony pentoxide have a flame retarding function.

In the present invention, the powder material is pulverized by wet pulverization to an average particle size of at most 5 $\mu$m. If the average particle size exceeds 5 $\mu$m, precipitation of powder material tends to take place in the slurry, whereby it tends to be difficult to obtain microspheres. This average particle size is preferably at most 3 $\mu$m, more preferably at most 1 $\mu$m.

As compared with dry pulverization, the wet pulverization is easy for fine pulverization and free from environmental pollution by a dust. The liquid to be used for the wet pulverization is not particularly limited, and a flammable liquid such as kerosine, light oil, heavy oil, or an alcohol, may, for example, be mentioned. Among them kerosine, alcohol or light oil is particularly preferred, since it is easy to handle the price is economical and easy to purchase.

Further, it is preferred to use the same liquid as used for the preparation of the slurry and then combustion, whereby the production process can be simplified. The concentration of the mixed material in the liquid in the wet pulverization step is preferably such that the amount of the liquid is adjusted so that the concentration of the mixed material will be the same as the concentration of the mixed material in the slurry which will be sprayed, whereby the production process will be simplified.

The wet pulverizer to be used, is preferably a medium-agitation type mill such as a beads mill, whereby fine pulverization can readily be carried out, and dispersion uniformity of different types of powder material will be improved. However, the pulverizer may be any other wet type pulverizer. To minimize contamination from the material of the pulverizer, the material for the liquid-contacting portion thereof is preferably selected from the same material as the powder material, such as quarts, alumina., zirconia or a composite ceramics of alumina and zirconia, which is excellent in the abrasion resistance.

If the slurry of the mixed material thus obtained does not have a prescribed concentration, an additional liquid may be added for dilution, or the slurry may be concentrated to the prescribed concentration. If the concentration of the solid content in the slurry is too low, the productivity and the economical efficiency will decrease, and if it is too high, the viscosity increases, whereby it will be difficult to form fine liquid droplets, and consequently it will be difficult to obtain inorganic microspheres having a uniform and small particle size. The concentration of the mixed material in the slurry is preferably within a range of from 5 to 50 wt %, more preferably from 10 to 40 wt %.

A surfactant may be incorporated for dispersion of this slurry, for stabilizing the dispersion or for reducing the viscosity of the slurry. As such a surfactant, a nonionic surfactant, a cationic surfactant, an anionic surfactant or a polymer type surfactant may, for example, be employed. Particularly preferred is an acid-containing oligomer type polymer surfactant.

As the liquid constituting the slurry, a flammable liquid is used so that it will subsequently be sprayed and also burned for heating. As such a flammable liquid, an organic medium such as a hydrocarbon, an alcohol, an ether or a ketone may, for example, be employed. From the viewpoint of handling efficiency, the one having a boiling point of at least 50° C. is preferred. Particularly kerosine, light oil and an alcohol are easy to handle, inexpensive and readily combustible, whereby the mixed material can efficiently and uniformly be heated, and thus they are suitable for a liquid constituting the slurry of the present invention.

Such a slurry is sprayed to form a liquid droplets, and the liquid droplets are heated, whereby the powder material contained in the liquid droplets will fuse or sinter to form microspheres. When the powder material is a glass formulation mixed powder material, it will be melted to form glass microspheres.

For the spraying, it is possible to employ a spraying device such as a liquid column or liquid film type two fluid nozzle, or an ultrasonic sprayer. From the viewpoint of mass production and efficient atomization, it is preferred to use a two fluid nozzle. When the liquid for the slurry is a flammable liquid and prevention appearance irregular shaped submicron powders, the gas to be used for spraying is preferably an air, oxygen gas containing a non-flammable gas or non-flammable gas itself such as carbon dioxide gas, nitrogen gas or combustion exhaust gas to control the combustion rate of the flammable liquid. If the gas for spraying is pure oxygen, the combustion rate will be high, whereby non-granulated powder tends to deposit on the surface of formed microspheres, or classification will be required depend on usages, such being undesirable.

Combustion of the flammable liquid is carried out while supplying oxygen gas or a combustion-assisting gas containing oxygen gas. The oxygen gas concentration influences the combustion temperature and is therefore suitably selected depending upon the temperature for fusing or sintering the powder material. If the oxygen gas concentration is too low, the temperature during the fusing and/or sintering will be low, whereby formation of microspheres will be inadequate. Further, in a case where no adequate energy for fusing or sintering the powder material can be attained by the combustion of the flammable liquid, supplemental heating may be carried out by an electrical heater or supplemental furnace.

In the case of microballoons, when the liquid droplets are heated, the powder material is melted, and due to its surface tension and by the gas generated by the blowing agent, microspheres will be formed.

The heating temperature depends on the temperature at which the powder material fuses or sinters and on the residence time. Specifically, the temperature is from 300° to 2,500° C.

Formed inorganic microspheres are recovered by a conventional method such as recovery method by means of a bag filter or a wet system packed bed.

Inorganic microbeads (solid spheres) and/or inorganic microballoons (hollow spheres) thus produced have an average particle size of from 0.1 to 20 µm, wherein particles having particle sizes of at most 50 µm constitute at least 90% of the entire particles.

The inorganic microspheres produced by the present invention are suitable as a filler. For example, when they are incorporated to a resin, warping or deformation will be small, and smoothness of a molded surface will be high, since surface smoothness of microspheres is high, and thus they are suitable as a filler to be used for precision machines and instruments. In the case of microballoons, weight reduction can be accomplished. Further, in the case of microbeads, it is possible to optionally select a material containing little eluting impurities, and they undergo little expansion or shrinkage and can be loaded in a high proportion, whereby such microbeads are particularly suitable for a filler for sealing semiconductors such as IC or LSI, as a filler which scarcely leads to an electronic device error. The inorganic microspheres produced by the present invention have good slip properties and show little absorption of e.g. oil and fat, whereby they are suitable for incorporation to cosmetics. Especially, alumina microbeads, silica microbeads and silica-titania glass microbeads produced by the present invention are particularly excellent in the above properties and suitable for the above applications.

Further, inorganic microspheres containing a powder having a certain specific function such as an ultraviolet absorbing function, a flame retarding function, an electromagnetic shielding function, a photocatalytic function or an antibacterial function, can be used in a wide range of applications, as they impart a high performance to conventional fillers. Especially, silica microbeads containing a powder having the above-mentioned function, not only have such a function, but also are excellent in slip properties as they are sphere.

According to the present invention, it is possible to obtain inorganic microspheres having a uniform particle size. This may be explained as follows. Namely, the mixed material and the liquid are mixed to obtain a slurry, the slurry is formed into fine liquid droplets having a uniform particle size, which are then heated, so that the mixed material powder contained in each liquid droplet is heated, and fuses or sinters or foams to form an inorganic microsphere. Especially when a glass formulation mixed material is used, vitrification can simultaneously be accomplished, whereby the process can be substantially shortened.

Now, the present invention will be described in further detail with reference to Examples. However, it should be understood that the present invention is by no means restricted to such specific Examples.

EXAMPLE 1
Production of glass microbeads 87.5 g of silicon dioxide, 17.4 g of sodium carbonate, 21.9 g of calcium oxide, 33.4 g of boric acid, 1.35 g of zinc oxide, 0.65 g of aluminum oxide, 5.3 g of calcium secondary phosphate, 3.3 g of lithium carbonate and 2 g of potassium carbonate were mixed to 700 g of kerosine, and the mixture was subjected to wet pulverization by means of a beads mill to prepare a slurry of the material.

The beads mill used, was made of zirconia and had an internal capacity of 1,400 ml. Beads made of zirconia having an average diameter of 0.65 mm were used in an amount of 1,120 ml. The pulverization was carried out for 30 minutes at a rotational speed of 2,500 rpm to obtain fine powder. The obtained fine powder of mixed material was observed by a scanning electron microscope, whereby the average particle size was 0.5 µm.

Using air as a spraying gas, the slurry was sprayed into air by a two fluid nozzle and, by bringing a flame close thereto, ignited to carry out spray combustion to obtain fine particles. The combustion temperature at that time was 1,200° C. The fine particles were recovered by a bag filter, and the following measurements were carried out with respect to the fine particles.

The average particle size was 8 µm as measured by light scattering method, and particles of at most 30 µm constituted 95% of the entire particles. From the observation by a scanning electron microscope, each particle was found to be spherical. Further, from the result of measurement of the specific gravity by a gas-change type specific gravity meter, the fine particles were found to be solid bodies. Further, from the results of the X-ray diffraction measurement, each particle was confirmed to be glass.

EXAMPLE 2
Production of alumina microbeads 183.5 g of aluminum hydroxide powder was mixed into 600 g of kerosine, followed by wet pulverization in the same manner as in Example 1 by means of a beads mill to prepare a slurry of the material.

The aluminum hydroxide was recovered from the obtained slurry of the material and observed by a scanning electron microscope, whereby the average particle size was 0.5 µm.

Using carbon dioxide gas as a spraying gas, the slurry of the material was sprayed into 100 vol % oxygen in a tubular furnace set at 2,500° C. by means of a two fluid nozzle and, by bringing a flame close thereto, ignited to carry out spray combustion to obtain fine particles. The fine particles were recovered by a bag filter, and the same measurements as in Example 1 were carried out. As a result, the average particle size was 5 µm, and particles of at most 30 µm constituted 97% of the entire particles. From the results of the scanning electron microscopic observation and the specific gravity measurement, each particle was found to be a spherical solid body. Further, from the results of the X-ray diffraction measurement, the fine particles were confirmed to be α-alumina.

EXAMPLE 3

Production of glass microbeads containing functional powder

A formulation material prepared by mixing 49.00 g of silicon dioxide, 9.72 g of sodium carbonate, 12.24 g of calcium oxide, 18.70 g of boric acid, 0.76 g of zinc oxide, 0.36 g of aluminum oxide, 2.97 g of calcium secondary phosphate, 1.85 g of lithium carbonate and 1.12 g of potassium carbonate, and 36.0 g of cerium oxide having an ultraviolet ray absorbing function, were mixed into 600 g of kerosine, followed by wet pulverization by means of a beads mill to obtain a slurry of the formulation material.

The beads mill used, was the same as used in Example 1, and the pulverization was carried out at a rotational speed of 2,500 rpm for 40 minutes. A solid content was recovered from the obtained slurry of the formulation material and observed by a scanning electron microscope, whereby the average particle size was 0.4 $\mu$m.

Using air as a spraying gas, the slurry was sprayed into air by a two fluid nozzle and, by bringing a flame close thereto, ignited to carry out spray combustion to obtain fine particles containing a functional powder. The combustion temperature at that time was 1,200° C. The fine particles were recovered by a bag filter and the same measurements as in Example 1 were carried out, whereby the average particle size was 7 $\mu$m, and particles of at most 30 $\mu$m constituted 93% of the entire particles. From the scanning electron microscopic observation and the specific gravity measurement, each particle was found to be a spherical solid body. 30 wt % of the fine spherical solid bodies, 20 wt% of liquid paraffin and 50 wt % of vaseline were mixed and sandwiched in a thickness of 25 $\mu$m between quartz plates, whereupon the light transmittance was measured, and the transmittance of ultraviolet rays of 320 nm or less, was not higher than 23%, thus indicating an excellent ultraviolet ray absorbing function.

Now, Examples for producing silica microbeads will be described.

EXAMPLE 4

250 g of silica sand powder and 12 g of an acid-containing oligomer were mixed into 600 g of kerosine, followed by wet pulverization in the same manner as in Example 1 using a beads mill to obtain a slurry of the material. Silica sand was recovered from the obtained slurry of the material and observed by a scanning electron microscope, whereby the average particle size was 0.2 $\mu$m.

Using carbon dioxide gas as a spraying gas, the slurry of the material was sprayed into 80 vol % oxygen by a two fluid nozzle and, by bringing a flame close thereto, ignited to carry out spray combustion to obtain fine particles. The fine particles were recovered by a bag filter, and the same measurements as in Example 1 were carried out, whereby the average particle size was 3 $\mu$m, and particles of at most 10 $\mu$m constituted 93% of the entire particles. From the results of the scanning electron microscopic observation, the X-ray diffraction measurement and the specific gravity measurement, the fine particles were found to be spherical non-porous amorphous bodies. From the results of the specific gravity measurement, they were found to be solid (non-hollow) bodies.

EXAMPLE 5

100 g of silica gel, 54 g of titanium dioxide having an ultraviolet ray absorbing function and 14 g of an acid-containing oligomer were mixed into 600 g of kerosine, followed by wet pulverization by means of a beads mill to obtain a slurry of a formulation material.

The beads mill used, was the same as used in Example 4, and the pulverization was carried out at a rotational speed of 2,500 rpm for 40 minutes. A solid content was recovered from the obtained slurry of the formulation material and observed by a scanning electron microscope, whereby the average particle size of the silica gel was 0.2 $\mu$m.

Using carbon dioxide gas as a spraying gas, the slurry was sprayed into 40 vol % oxygen by a two fluid nozzle and, by bringing a flame close thereto, ignited to carry out spray combustion to obtain fine particles containing a functional powder. The combustion temperature at that time, was 1,500° C. The fine particles were recovered by a bag filter, and the same measurements as in Example 1 were carried out, whereby the average particle size was 2 $\mu$m, and particles of at most 10 $\mu$m constituted 95% of the entire particles. From the results of the scanning electron microscopic observation and the specific gravity measurement, the fine particles were found to be spherical solid bodies. With respect to these particles, the light transmittance was measured in the same manner as in Example 3, whereby the transmittance of ultraviolet rays of 320 nm or less, was not higher than 20%, thus indicating an excellent ultraviolet ray absorbing function.

EXAMPLE 6

The operation was carried out in the same manner as in Example 5 except that the spraying gas was changed to 100 vol % oxygen, and spraying was carried out into 100 vol % oxygen, whereby a fine powder formed in addition to spherical particles, and a small amount of such a fine powder was deposited on the surface of the particles.

Comparative Example 1

100 parts of silica sand dry-pulverized to have an average particle size of 23 $\mu$m and 5 parts of an acid-containing oligomer were dispersed in kerosine to obtain a slurry having a concentration of 40%. Spraying was carried out in the same manner as in Example 5, whereby silica sand was separated and precipitated, and the spraying was not stabilized, and the obtained powder contained irregularly shaped particles and had a wide particle size distribution. Accordingly, the powder was poor in the sliding properties.

Comparative Example 2

Silica sand powder wet-pulverized in the same manner as in Example 5, was recovered from the slurry, and the dried fine powder was subjected to spray combustion in 100 vol % oxygen by liquid propane gas, whereby the average particle size of the obtained silica particles was 30 $\mu$m, and a fine powder was deposited on the surface of the particles in a substantial amount.

Now, Examples for producing glass microballoons will be described.

EXAMPLE 7

17.5 g of silicon dioxide, 6.7 g of boric acid and 8.6 g of sodium sulfate were mixed to prepare a glass formulation material, which was subjected to wet pulverization by a ball mill to obtain a slurry of the glass formulation material. The ball mill used, was a table type ball mill having an internal capacity of 500 ml and balls made of alumina and having diameters of from 10 to 15 mm were used in an amount of about 250 ml. Into such a ball mill, the above glass formulation material and 150 g of kerosine were introduced and wet-pulverized at 100 rpm for 8 hours to obtain a slurry of the glass formulation material. The glass formulation material was recovered from the obtained slurry and observed by a scanning type electron microscope, whereby the average particle size was 2.1 μm.

Using air as a spraying gas, the obtained slurry of the glass formulation material was sprayed into air and, by bringing a flame close thereto, ignited to carry out spray combustion, whereby vitrification and production of glass microballoons were carried out simultaneously. The pressure for spraying at that time, was 1.5 kg/cm², and the size of each liquid droplet was about 20 μm. The obtained glass microballoons were recovered by a bag filter and then mixed with water and subjected to centrifugal separation, whereupon the floating ratio on water was measured, and about 40 wt % of microballoons were found to float on the water surface. The average particle size of the glass microballoons floating on the water surface was 11 μm. By the scanning electron microscopic observation, particles of at least 30 μm were found to be less than 5%, and no particle exceeding 50 μm or less than 3 μm was observed. The apparent density measured by a gas-change type specific gravity meter was 0.65 g/cm³. Further, the obtained glass microballoons were found to be vitreous, as a result of the X-ray diffraction measurement.

EXAMPLE 8

70.0 g of silicon dioxide, 12.9 g of sodium carbonate, 17.5 g of calcium carbonate, 26.7 g of boric acid, 1.1 g of zinc oxide, 0.5 g of aluminum oxide, 4.2 g of calcium secondary phosphate, 2.7 g of lithium carbonate, 1.6 g of potassium carbonate and 1.27 g of sodium sulfate were mixed into 600 g of kerosine, followed by wet-pulverization in the same manner as in Example 1 using a beads mill to obtain a slurry of a glass formulation material.

A glass formulation material was recovered from the obtained slurry and observed by a scanning electron microscope, whereby the average particle size was 0.5 μm.

Using air as a spraying gas, the obtained slurry of the glass formulation material, was sprayed into air by a two fluid nozzle and, by bringing a flame close thereto, ignited to carry out spray combustion to obtain glass microballoons. The glass microballoons were recovered by a bag filter and then mixed with water, followed by centrifugal separation, whereupon the floating ratio on water was measured, and about 65 wt % of the microballoons were found to float on the water surface.

The average particle size of the glass microballoons floating on the water surface was 15 μm. By the scanning electron microscopic observation, particles of at lest 25 μm was found to be less than 5%, and no particle exceeding 50 μm or less than 3 μm was observed. The apparent density of the product floating on water, as measured by an air-comparison type specific gravity meter, was 0.5 g/cm³. The obtained glass microballoons were found to be vitreous, as a result of the X-ray diffraction measurement.

EXAMPLE 9
Production of silica-titania glass microbeads 100 g of silica gel having an average particle size of 10 μm, 6.4 g of titanium oxide having an average particle size of 0.25 μm and 11 g of an acid-containing oligomer, were mixed into 600 g of kerosine, followed by wet-pulverization in the same manner as in Example 1 using a beads mill to obtain a slurry of the material.

A powder was recovered from the obtained slurry of the material and observed by a scanning electron microscope, whereby the average particle size was about 0.2 μm.

Using carbon dioxide gas as a spraying gas, the slurry of the material was sprayed into a gas comprising 40% of oxygen and 60% of carbon dioxide gas by means of a two fluid nozzle and, by bringing a flame close thereto, ignited to carry out spray combustion to obtain fine particles. The fine particles were recovered by a bag filter. From the elemental analysis by fluorescent X-ray, the content of titania was found to be 6 wt %. The average particle size as measured by a laser beam scattering method was 3 μm, and particles of at most 10 μm constituted 93% of the entire particles. From the results of the scanning electron microscopic observation, the particles were found to be spherical, and from the result of the X-ray diffraction measurement, they were found to be amorphous. Further, from the result of the specific gravity measurement, they were found to be solid bodies. Such silica-titania glass microbeads were baked in a baking furnace to obtain a formed product, and the linear expansion coefficient of the formed product was $0.1 \times 10^{-7}$ (/°C.)

Comparative Example 3

100 parts of silica sand dry-pulverized to have an average particle size of 23 μm and 10 parts of titanium oxide having an average particle size of 0.25 μm, were mixed, and this powder was subjected to spray combustion in 100 vol % oxygen by liquid propane gas, whereby silica particles and titania particles did not completely fuse to each other, and from the X-ray diffraction, peaks of titanium oxide crystals were detected, whereby a silica-titania glass powder having a uniform composition was not obtained. Further, a fine powder having irregular shapes was contained in a substantial amount.

EXAMPLE 10

100 g of silica gel having an average particle size of 50 μm, 9.5 g of boric acid having an average particle size of 25 μm and 11 g of an acid-containing oligomer were mixed into 600 mg of kerosine, followed by wet-pulverization in the same manner as in Example 1 using a beads mill to obtain a slurry of the material.

A powder was recovered from the obtained slurry of the material and observed by a scanning electron microscope, whereby the average particle size was about 0.2 μm.

Using carbon dioxide gas as a spraying gas, the slurry of the material was sprayed into 80 vol % oxygen by means of a two fluid nozzle and, by bringing a flame close thereto, ignited to carry out spray combustion to obtain fine particles. The fine particles were recovered by a bag filter. By the elemental analysis by a wet analysis, $SiO_2$ was found to be 95 wt %, and $B_2O_3$ was found to be 5 wt %. The average particle size as measured by a laser beam scattering method was 3 μm, and particles of at most 20 μm constituted 97%. From the results of the scanning electron microscopic observation and the X-ray diffraction measurement, the particles were found to be spherical amorphous bodies. From the result of the specific gravity measurement by a air comparison type specific gravity meter, they were found to be solid bodies.

EXAMPLE 11

The operation was carried out in the same manner as in Example 1 except that 82 g of silica gel having an average particle size of 50 μm, 25 g of boric acid having an average particle size of 25 μm, 2 g of alumina having an average particle size of 10 μm, 5.5 g of sodium carbonate having an average particle size of 30 μm and 11 g of an acid-containing oligomer were used. The obtained powder was subjected to elemental analysis by ion chromatography, whereby the contents of $SiO_2$, $B_2O_3$, $Al_2O_3$ and $Na_2O$ were 82 wt %, 13 wt %, 2 wt % and 3 wt %, respectively. The average particle size as measured by a laser beam scattering method was 5 μm, and particles of at most 20 μm constituted 95%. From the results of the scanning electron microscopic observation and the X-ray diffraction measurement, the particles were found to be spherical amorphous bodies. From the results of the specific gravity measurement by an air comparison type specific gravity meter, they were found to be solid bodies.

According to the present invention, inorganic microspheres having a uniform particle size can readily be produced on an industrial scale. When a flammable liquid is used as a liquid for the slurry which can subsequently be used for heating the powder in the slurry, the heat efficiency and the operation efficiency will be improved, and microspheres can easily be produced even from a material having a high fusing or sintering temperature. Further, wet pulverization is employed for pulverization of the material, whereby the pulverization is easy, and the uniformity will be improved. The portion of the material after classification which is not used for the product, can be easily recycled to the wet pulverization step, whereby no environmental pollution due to a dust will result. Further, when the material is a glass formulation material, vitrification can simultaneously be accomplished during the spray combustion step, whereby no separate step for preparation of glass cullets is required.

What is claimed is:

1. A process for producing inorganic microspheres, which comprises pulverizing a material by wet pulverization with a flammable liquid to an average particle size of at most 5 μm to obtain a slurry of a pulverized powder material, spraying the slurry into a gas to form liquid droplets, and heating the liquid droplets to fuse or sinter the powder material to obtain inorganic microspheres.

2. The process for producing inorganic microspheres according to claim 1, wherein the powder material is fused or sintered by combustion of said flammable liquid.

3. The process for producing inorganic microspheres according to claim 1, wherein the flammable liquid is selected from the group consisting of kerosine, light oil and an alcohol.

4. The process for producing inorganic microspheres according to claim 1, wherein spraying the slurry by a two fluid nozzle.

5. The process for producing inorganic microspheres according to claim 4, wherein the gas to be used for spraying is selected from the group consisting of a non-flammable gas, air, oxygen gas containing a non-flammable gas and mixtures thereof.

6. The process for producing inorganic microspheres according to claim 5, wherein the non-flammable gas is selected from the group consisting of carbon dioxide gas, nitrogen gas and combustion exhaust gas.

7. The process for producing inorganic microspheres according to claim 1, wherein the material is pulverized by wet pulverization to an average particle size of at most 3 μm.

8. The process for producing inorganic microspheres according to claim 1, wherein the material is a blended powder material prepared by blending a plurality of powder materials which vitrify under heating.

9. The process for producing inorganic microspheres according to claim 1, wherein the material is quartz or silica sand.

10. The process for producing inorganic microspheres according to claim 1, wherein the material contains a powder of a metal oxide having an ultraviolet ray absorbing function or a precursor of said metal oxide.

11. The process for producing inorganic microspheres according to claim 1, wherein the powder material contains a blowing agent which foams under heating, and the powder material fuses to form microballons.

* * * * *